US007139737B2

(12) United States Patent
Takahashi et al.

(10) Patent No.: US 7,139,737 B2
(45) Date of Patent: Nov. 21, 2006

(54) APPARATUS AND METHOD FOR MANAGING SOFTWARE LICENSES AND STORAGE MEDIUM STORING A PROGRAM FOR MANAGING SOFTWARE LICENSES

(75) Inventors: Yoshinori Takahashi, Urayasu (JP); Yoshio Ozawa, Yokohama (JP); Shigenobu Fujiwara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 444 days.

(21) Appl. No.: 09/773,528

(22) Filed: Feb. 2, 2001

(65) Prior Publication Data

US 2001/0013024 A1 Aug. 9, 2001

(30) Foreign Application Priority Data

Feb. 8, 2000 (JP) ............................. 2000-029944

(51) Int. Cl.
*G06Q 99/00* (2006.01)
*H04K 1/00* (2006.01)
*H04L 9/00* (2006.01)

(52) U.S. Cl. ........................... 705/59; 705/50; 705/51; 705/52; 705/53; 705/54; 705/55; 705/56; 705/57; 705/58; 705/1; 705/2; 709/229; 709/203; 709/223; 709/224; 707/10; 707/104.1; 713/2; 380/277; 726/29

(58) Field of Classification Search .................... 705/1, 705/2, 50–59; 709/203, 223, 224, 229; 707/10, 707/104; 713/2; 380/277; 726/29
See application file for complete search history.

(56) References Cited

U.S. PATENT DOCUMENTS 5,754,763 A * 5/1998 Bereiter .................. 395/187.01
6,021,438 A * 2/2000 Duvvoori et al. ........... 709/224

FOREIGN PATENT DOCUMENTS

JP 10143363 A * 5/1998

* cited by examiner

*Primary Examiner*—James A Reagan
(74) *Attorney, Agent, or Firm*—Staas & Halsey LLP

(57) ABSTRACT

An inventory information collecting unit automatically collects inventory information including inventory information regarding software installed in each of a plurality of computers within an organization. A usage-state information collecting unit updates a software license usage number which represents the number of software licenses used in each section of the organization. When the sum of the software license usage numbers of the respective sections of the organization exceeds a software license holding number which represents the number of software licenses owned by the organization, a license purchasing unit generates a purchase transaction for purchasing software licenses, the number of which is equal to the difference between the sum and the software license holding number and transfers a purchase expense to relevant sections.

10 Claims, 13 Drawing Sheets

FIG. 4A

| LICENSE CODE | NECESSARY NUMBER | HOLDING NUMBER (Z) | RIGHT NUMBER | REQUEST NUMBER | CORRECTED REQUEST NUMBER | USAGE NUMBER | NEGOTIATED UNIT PRICE |
|---|---|---|---|---|---|---|---|
| A | 4 | 2 | 2 | 0 | 0 | 2 | 1000 |
| B | 5 | 2 | 2 | 2 | 2 | 1 | 500 |

FIG. 4B

| ORIGANIZATION CODE | LICENSE CODE | NECESSARY NUMBER | RIGHT NUMBER | REQUEST NUMBER | CORRECTED REQUEST NUMBER | USAGE NUMBER |
|---|---|---|---|---|---|---|
| D001 | A | 2 | 1 | 0 | 0 | 1 |
| D001 | B | 2 | 1 | 2 | 2 | 1 |
| D002 | A | 2 | 1 | 0 | 0 | 1 |
| D002 | B | 3 | 1 | 0 | 0 | 0 |

FIG. 4C

| ORGANIZATION CODE | EMPLOYEE ID | RESPONSIBILITY | INFORMATION FOR CONTACT |
|---|---|---|---|
| D001 | P0001 | | |
| D002 | P0002 | | |
| D001 | P0003 | | |

FIG. 4D

| EMPLOYEE ID | EQUIPMENT ID | LICENSE CODE | USAGE NUMBER |
|---|---|---|---|
| P0001 | PC01 | A | 1 |
| P0001 | PC01 | B | 1 |
| P0002 | PC02 | A | 1 |

FIG. 4E

| ORDER NUMBER | LICENSE CODE | PURCHASE NUMBER | PURCHASE PRICE | DATE |
|---|---|---|---|---|
| EX001 | A | 2 | 2000 | 11.29 |
| EX001 | B | 2 | 1000 | 11.29 |
| EX002 | | | | |

| ORGANIZATION CODE | LICENSE CODE | ORDER NUMBER | EXPENSE | DATE |
|---|---|---|---|---|
| D001 | A | EX001 | 1000 | 11.29 |
| D001 | B | EX001 | 500 | 11.29 |
| D002 | A | EX002 | 1000 | 11.29 |
| D002 | B | EX001 | 500 | 11.29 |

29

| EMPLOYEE ID | EQUIPMENT ID | LICENSE CODE | USAGE NUMBER |
|---|---|---|---|
| P0002 | PC02 | A | 1 |
| P0002 | PC02 | B | 1 |

17

```
@MSPPFW95 AND @MSACSV209 = @FJSFNTPV
@FJNTCV11 OR @NAVFORDS9 OR @NAVNRPT19 = @NAVNRPT1
@OTHNUV30 OR @OTHVPV509 AND @OTHOCLWS = @OTHOCLW
    .
    .
    .
```

FIG. 10A

| ORGANIZATION HIERARCHY | LICENSE NAME | UNDER LICENSE MANAGEMENT | | | USAGE NUMBERS NOT MANAGED | | |
|---|---|---|---|---|---|---|---|
| | | HOLDING NUMBER | USAGE NUMBER | EXCESS OR INSUFFICIENCY | PRE-IN-STALLED | MANAGED BY SECTION | OTHERS |
| − ENTIRE COMPANY | PROG−2000 | 1000 | 990 | 10 | 0 | 0 | 0 |
| + MARKETING DEPARTMENT | AB−OFFICE99 | 500 | 510 | −10 | 20 | 0 | 0 |
| + PERSONNEL DEPARTMENT | | | | | | | |
| − DEVELOPMENT DEPARTMENT | | | | | | | |
|     FIRST − DEVELOPMENT | | | | | | | |
|     SECOND − DEVELOPMENT | | | | | | | |
| − AFFILIATED COMPANY A | | | | | | | |
| − AFFILIATED COMPANY B | | | | | | | |

FIG. 10B

| ORGANIZATION HIERARCHY | LICENSE NAME | UNDER LICENSE MANAGEMENT ||| USAGE NUMBERS NOT MANAGED |||
|---|---|---|---|---|---|---|---|
| | | RIGHT NUMBER | USAGE NUMBER | EXCESS OR INSUFFICIENCY | PRE-IN-STALLED | MANAGED BY SECTION | OTHERS |
| ENTIRE − COMPANY | | | | | | | |
| MARKETING + DEPARTMENT | PROG-2000 | 400 | 402 | −2 | 5 | 0 | 0 |
| PERSONNEL + DEPARTMENT | AB-OFFICE99 | 250 | 255 | −5 | 10 | 0 | 0 |
| DEVELOPMENT − DEPARTMENT | | | | | | | |
| FIRST − DEVELOPMENT | | | | | | | |
| SECOND − DEVELOPMENT | | | | | | | |
| AFFILIATED − COMPANY A | | | | | | | |
| AFFILIATED − COMPANY B | | | | | | | |

FIG. 10C

| ORGANIZATION HIERARCHY | LICENSE NAME | UNDER LICENSE MANAGEMENT ||| USAGE NUMBERS NOT MANAGED |||
|---|---|---|---|---|---|---|---|
| | | RIGHT NUMBER | USAGE NUMBER | EXCESS OR INSUFFICIENCY | PRE-IN-STALLED | MANAGED BY SECTION | OTHERS |
| – ENTIRE COMPANY | | | | | | | |
| + MARKETING DEPARTMENT | PROG–2000 | 20 | 10 | 10 | 0 | 0 | 0 |
| + PERSONNEL DEPARTMENT | AB–OFFICE99 | 0 | 0 | 0 | 0 | 0 | 0 |
| – DEVELOPMENT DEPARTMENT | | | | | | | |
| – FIRST DEVELOPMENT | | | | | | | |
| – SECOND DEVELOPMENT | | | | | | | |
| – AFFILIATED COMPANY A | | | | | | | |
| – AFFILIATED COMPANY B | | | | | | | |

FIG. 10D

| ORGANIZATION HIERARCHY | LICENSE NAME | UNDER LICENSE MANAGEMENT ||| USAGE NUMBERS NOT MANAGED |||
| --- | --- | --- | --- | --- | --- | --- | --- |
| | | RIGHT NUMBER | USAGE NUMBER | EXCESS OR INSUFFICIENCY | PRE-IN-STALLED | MANAGED BY SECTION | OTHERS |
| + ENTIRE COMPANY | | | | | | | |
| – AFFILIATED COMPANY A | PROG-2000 | 50 | 50 | 0 | 0 | 0 | 0 |
| – AFFILIATED COMPANY B | AB-OFFICE99 | 100 | 100 | 0 | 0 | 0 | 0 |

APPARATUS AND METHOD FOR MANAGING SOFTWARE LICENSES AND STORAGE MEDIUM STORING A PROGRAM FOR MANAGING SOFTWARE LICENSES

CROSS REFERENCE TO THE RELATED APPLICATIONS

The contents of Japanese patent Application No. 29944/2000, filed on Feb. 8, 2000 in Japan, are incorporated herein by reference.

BACKGROUND OF THE INVENTION

1. Field of the Invention

The present invention relates to an apparatus and method for managing software licenses, as well as to a storage medium storing a program for managing software licenses, and more particularly to a computer-applied technique capable of flexibly correcting, on an organization-wide scale, the difference between the number of purchased software licenses and the number of software licenses actually used within each section of the organization.

2. Description of the Related Art

There exists a system which manages software licenses in a single organization (an enterprise, a foundation, or a group, etc.) on the basis of the number of purchased software licenses and the state of usage of software licenses, whereby the organization can avoid holding an excess or insufficient number of software licenses. However, there does not exist a system capable of flexibly coping with daily organizational changes, a system capable of taking into consideration cost sharing by different sections (sections, divisions, or departments, etc.) of the organization, or a system having a function for providing management not only for a single company but also for other companies within the same group.

In general, software licenses are managed with each section of an organization being considered as a unit. Therefore, in order to strictly manage software licenses, while reflecting variations in the number of users attributable to organizational changes, a person within each section in charge of purchasing software must manage the number of purchased software licenses and the number of software licenses actually used within the section, which change according to organizational changes. However, since software licenses are intangible, strict monitoring of such changes requires a huge volume of work, and therefore is almost impossible in actuality. As a result, illegal copying may inadvertently be performed frequently, and in some cases an excess number of software licenses may be purchased.

Specifically, the following problems have arisen. In the following illustrative scenario, it is assumed that a certain section purchased twenty licenses of a piece of software A, and after receipt of a license certificate from a vendor, the software was installed in twenty personal computers. Subsequently, ten persons were moved to another section together with their personal computers, i.e., ten of the twenty personal computers were moved to another section due to an organizational change.

According to our study, under such circumstances, the following two methods are considered as a method for managing software licenses.

In the first method, the software is uninstalled from the personal computers of the ten moved persons, and software licenses are purchased for the section to which the persons have moved, in order to enable installation of the software. However, this method has the drawback that ten software licenses, which are not used any more in the original section, become useless.

In the second method, the ten moved persons are allowed to use the software in the section to which they have moved. However, this method has the drawback that since the license certificate is a sheet of paper, there arise difficulties in proving that the ten moved person have software licenses and difficulties in managing the number of software licenses in the section from which the persons have moved.

Further, according to our study, each section of an organization individually purchases software licenses within a budget allotted thereto. Therefore, unneeded purchases and illegal copying may be performed in each section, and it may be difficult to obtain a discount in the negotiated unit price, as discounts are commonly offered only when a large number of software licenses are purchased.

SUMMARY OF THE INVENTION

In view of the above-described problems, the objects of the present invention are to enable the difference between the number of software licenses purchased and the number of software licenses used in individual sections to be easily corrected on an organization-wide scale, to enable management of software licenses while taking into consideration cost sharing by different sections in the organization, to enable purchase of software licenses in the proper number, and to greatly reduce the negotiated unit price.

Further, another the object of the present invention is to provide an apparatus for managing software licenses which enables the difference between the number of software licenses purchased and the number of software licenses used in individual sections to be easily corrected on an organization-wide scale.

Furthermore, another the object of the present invention is to provide a method for managing software licenses which enables the difference between the number of software licenses purchased and the number of software licenses used in individual sections to be easily corrected on an organization-wide scale.

Still further, another the object of the present invention is to provide a storage medium storing a program for managing software licenses to realize an apparatus and a method which enables the difference between the number of software licenses purchased and the number of software licenses used in individual sections to be easily corrected on an organization-wide scale.

According to one aspect of the present invention, in an organization such as an enterprise, a foundation, or a group for which re-use of software licenses is permitted, not only a usage number and a holding number (purchased number) of software licenses in each section but also the total holding number within the entire organization for which re-use of software licenses is permitted is managed within the same system in order to eliminate the necessity of individual management within each section and to realize proper purchase of software licenses, thereby preventing illegal copying and unneeded purchases.

Specifically, the present invention provides an apparatus for managing software licenses which comprises: means for managing the total number of software licenses owned by an entire organization; means for collecting inventory information from each of a plurality of computers within the organization, the inventory information including information regarding software actually installed in each computer;

and means for calculating the difference between the number of software licenses owned by the entire organization and the number of software licenses actually in use on the basis of the collected inventory information, and for outputting information representing an excess or insufficiency in the number of software licenses or information regarding purchase of additional software licenses. The apparatus enables proper purchase of software licenses within the entire organization.

The present invention further provides an apparatus for managing software licenses which comprises: means for managing the total number of software licenses owned by an entire organization and the total number of software licenses allotted to each section of the organization; means for collecting inventory information from each of a plurality of computers within the organization, the inventory information including information regarding software actually installed in each computer; and means for calculating the difference between the number of software licenses allotted to each section of the organization and the number of software licenses actually used in the section on the basis of the collected inventory information, and for outputting warning information in a case that the number of software licenses in actual use is greater than the number of allotted software licenses. The apparatus prevents illegal copying of software, which would otherwise be inadvertently performed by an employee.

The present invention further provides an apparatus for managing software licenses which comprises: means for managing the total number of software licenses owned by an entire organization and the total number of software licenses allotted to each section of the organization; means for collecting inventory information from each of a plurality of computers within the organization, the inventory information including information regarding software actually installed in each computer; and means for calculating the difference between the number of software licenses allotted to each section of the organization and the number of software licenses actually used within the section on the basis of the collected inventory information and for outputting information which indicates that the section is allotted an excess number of software licenses compared with the number of software licenses in actual use. The apparatus calls attention to existence of excess software licenses.

Preferably, the apparatus according to the present invention further comprises means for generating a software dictionary which identifies software during collection of the inventory information. The generated software dictionary is distributed to each of the plurality of computers in the organization from which the inventory information is collected, and the inventory information is collected by the means for collecting the inventory information. Thus, section-by-section management of software licenses becomes and even in a case that organizational changes are effected, the total number of software licenses within the organization can be grasped correctly.

The present invention further provides an apparatus for managing software licenses which comprises: means for managing the number of software licenses owned by an entire organization; means for receiving from a higher-level server an organization-wide policy which is information regarding the logic for collection of a usage number of software licenses; means for generating, on the basis of the organization-wide policy, a software dictionary for identification of software and a license policy used for determination of the presence of a license; means for distributing the software dictionary to each of a plurality of computers within the organization in order to collect inventory information from each of the computers, the inventory information including information regarding software actually installed in each computer; and means for reporting to the higher-level server a usage number of software licenses calculated on the basis of the collected inventory information and the license policy. The apparatus enables management of software licenses in accordance with an operation policy within an entire group of enterprises.

The present invention further provides a method for managing software licenses which comprises: managing a software-license holding number which represents the number of software licenses owned by an entire organization; managing, for each section of the organization, a software-license right number which represents the total number of software licenses permitted to be used and a software-license usage number which represents the total number of software licenses in actual use; collecting inventory information from each of a plurality of computers within the organization, the inventory information including information regarding software actually installed in each computer; updating the software-license usage number of each section of the organization; in a case that the sum of the software-license usage numbers of all sections of the organization exceeds the software-license holding number, generating a purchase transaction for purchasing software licenses equal in number to the difference between the sum and the software-license holding number; adding the number of purchased software licenses to the software-license holding number; distributing a purchase expense to a section or sections whose software-license usage number is greater than the corresponding software-license right number; and updating the software-license right number of the section or sections. The method of the present invention enables management of software licenses, which greatly reduces the negotiated unit price due to bulk purchase for the entire organization and which takes into consideration expense sharing by the sections of the organization.

The present invention further provides a method for managing software licenses which comprises: managing a software-license holding number which represents the total number of software licenses owned by an entire organization; managing, for each section of the organization, a software-license right number which represents the total number of software licenses permitted to be used and a software-license usage number which represents the total number of software licenses in actual use; collecting inventory information from each of a plurality of computers within the organization, the inventory information including information regarding software actually installed in each computer; updating the software-license usage number of each section of the organization; in a case that the software-license holding number is greater than the sum of the software-license usage numbers of all sections of the organization, managing, as a software-license nonuse number, the difference between the software-license holding number and the sum; and in a case that a necessity of purchasing software licenses arises and that a total number of software licenses to be purchased in response to purchase requests from at least one section of the organization is grater than the software-license nonuse number, obtaining an actual number of software licenses to be purchased as the deference between them.

The present invention further provides an apparatus for managing software licenses which comprises: a managing unit managing a total number of software licenses owned by an organization having a plurality of computers; a collecting unit collecting inventory information from each of the plurality of computers within the organization, the inventory information including information regarding software actually installed in each computer; and a calculating unit calculating a difference between the number of software licenses owned by the entire organization and a number of software licenses actually in use which is calculated on the basis of the collected inventory information.

The present invention further provides an apparatus for managing software licenses which comprises: a network; a plurality of computers being within an organization and connected by the network in the form of a hierarchy; a managing unit provided in a higher-level computer in the hierarchy and managing at least a number of software licenses allotted to each section of the organizatio; a collecting unit provided in the higher-level computer and collecting inventory information from each of the plurality of computers within the organization, the inventory information including information regarding software actually installed in each computer; and a calculating unit provided in the higher-level computer and calculating a difference between the number of software licenses allotted to each section of the organization and a number of software licenses actually in use which is calculated on the basis of the collected inventory information.

A program which is used for effecting the above-described processing on a computer can be stored in an appropriate computer-readable storage medium such as a removable memory device, a semiconductor memory device, or a hard disk.

These, together with other objects and advantages which will be subsequently apparent, reside in the details of construction and operation as more fully hereinafter, described and claimed, with reference to the accompanying drawings, wherein like numerals refer to like parts throughout.

BRIEF DESCRIPTION OF THE DRAWINGS

FIGS. 4A to 4G are tables used in the license management server;

FIGS. 5A and 5B are diagrams describing a license policy;

FIGS. 10A to 10D are diagrams showing examples of screens used for referring to the state of usage of software licenses.

DESCRIPTION OF THE PREFERRED EMBODIMENT

Figure 1:
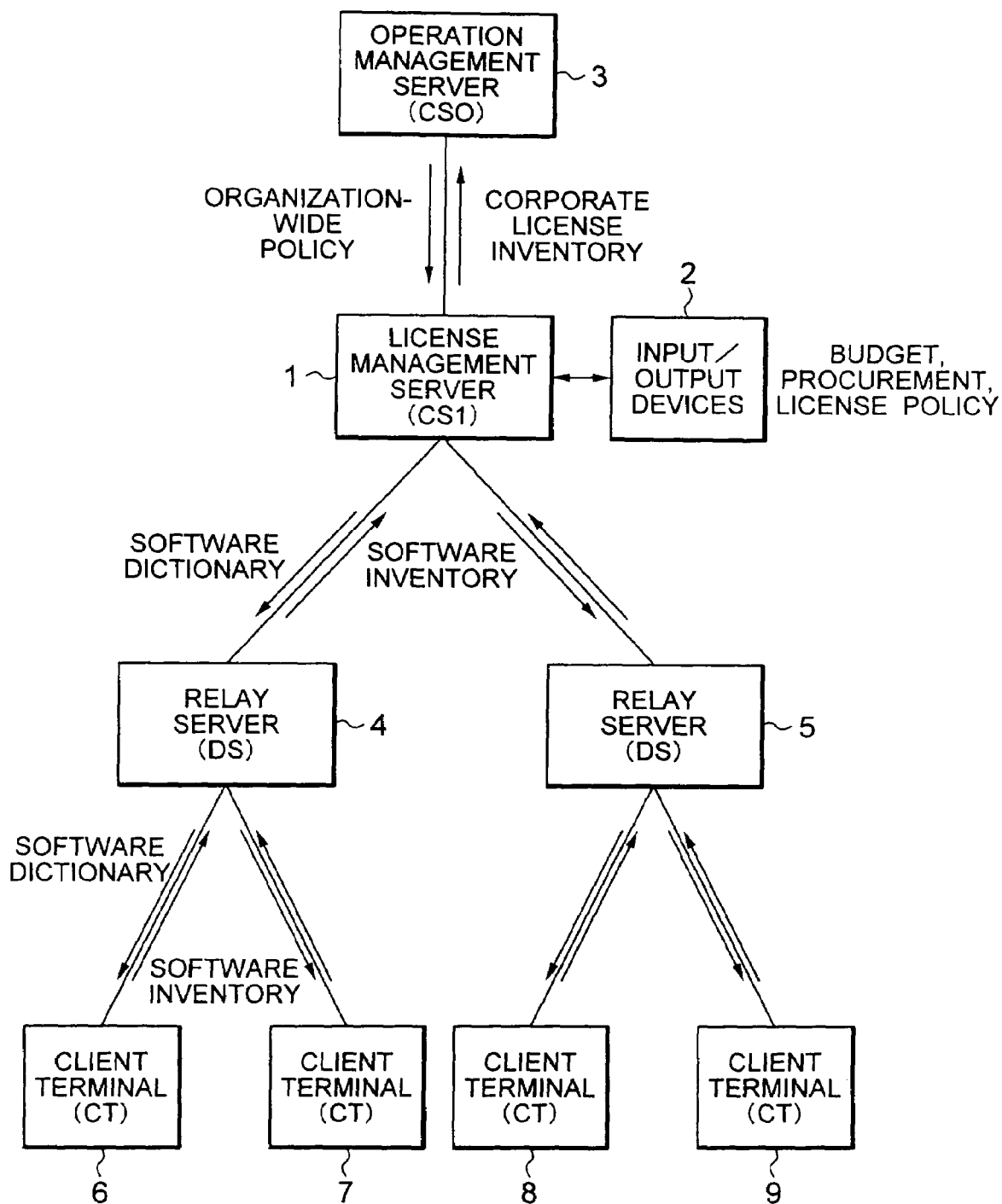
FIG. 1 is a block diagram showing the configuration of an embodiment of a system according to the present invention.

FIG. 1 is a block diagram showing the configuration of an embodiment of a system according to the present invention. A license management server (CS1) 1 is an apparatus for managing software licenses owned by an entire organization such as an enterprise, foundation, or group. Reference numeral 2 denotes input/output devices, such as a display and a keyboard, used for inputting and outputting budgetary information, information regarding product procurement, license policies, etc.

An operation managing server (CS0) 3 is a computer for managing the entire operation of a group of organizations, or it is a computer of an outside provider which provides a license management service (outsourcing). Relay servers (DS) 4 and 5 are generally installed in different sections of the organization or in different areas (domains), such as different buildings, which are unrelated to organizational arrangement and are adapted to collect information from and distribute information to a higher-level computer and lower-level computers via a network. Client terminals (CT) 6 to 9 comprise, for example, personal computers in which are installed software programs to be subjected to license management.

The operation managing server 3 creates an organization-wide policy 11, which is a logic for collecting information regarding the number of software licenses used and distributes the organization-wide policy to the license management server 1. On the basis of the organization-wide policy, the license management server 1 creates a software dictionary which is used to identify software programs when inventory information is automatically collected. The thus-created software dictionary is distributed to all the client terminals 6 to 9 via the relay servers 4 and 5. On the basis of the thus-distributed software dictionary, information (software inventory) regarding software programs installed in the client terminals 6 to 9 is collected by the license management server 1 via the relay servers 4 and 5. This collection of inventory information can be performed by use of an existing tool for collecting inventory information.

With reference to the thus-collected software inventory information, the license management server 1 judges whether the total number of software licenses used within the organization and the number of software licenses used within each section are proper. A result of the judgment is reported to the operation managing server 3 as a corporate license inventory. When the total number of software licenses used within the organization is greater than the software licenses owned by the organization, processing for purchasing licenses is performed. When the number of software licenses used in each section is inappropriate, warning information indicating the inappropriateness is output.

Figure 2:
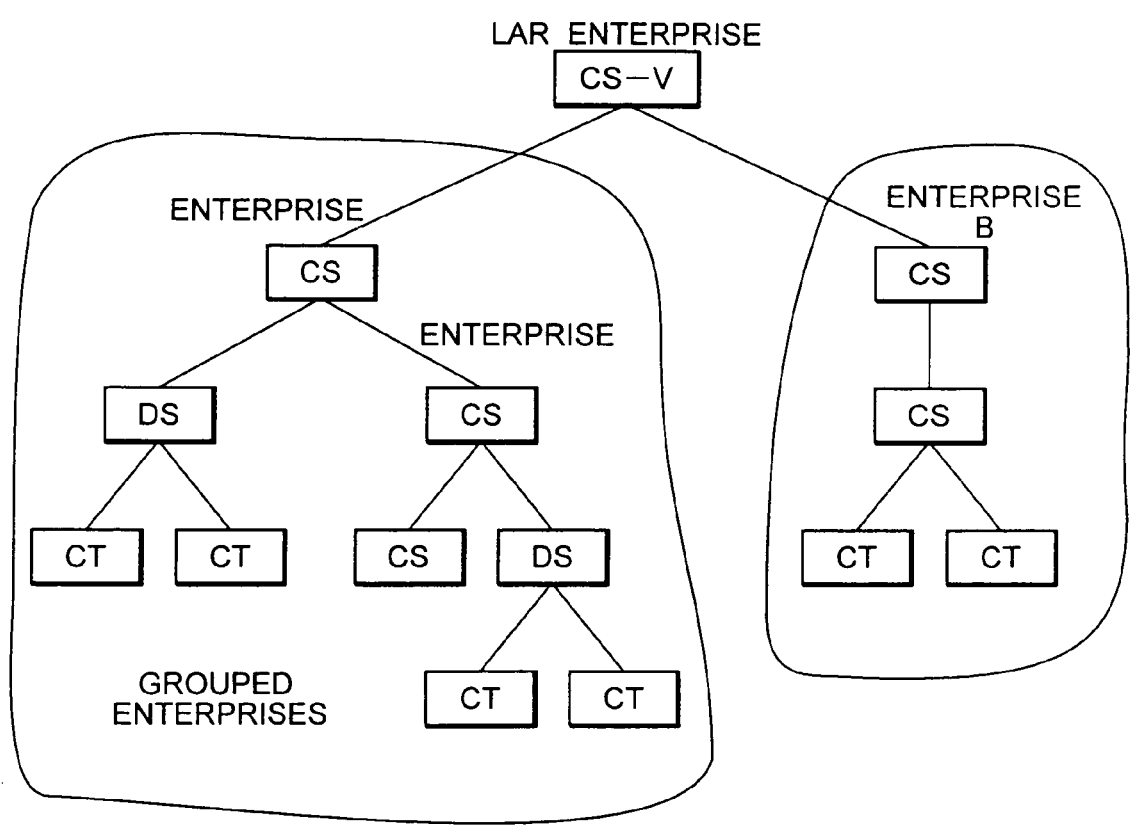
FIG. 2 is a block diagram showing an example of connection within the system of FIG. 1.

FIG. 2 shows an example of connection within the system of FIG. 1. In FIG. 2, reference symbol CS denotes corporate servers corresponding to the license management server 1 and the operation managing server 3 shown in FIG. 1. Reference symbol DS denotes domain servers corresponding to the relay servers 4 and 5 shown in FIG. 1. Reference symbol CT denotes client terminals corresponding to the client terminals 6 to 9 shown in FIG. 1 which are subjected to inventory monitoring. Reference symbol CS-V denotes a computer of a large account reseller (LAR) which is adapted to distribute software contents and issue license certificates.

The client terminal CT is connected to one domain server DS or corporate server CS at a higher level. The domain server DS can be provided at any hierarchical level and is connected to one domain server DS or corporate server CS at a higher level. The corporate server CS can be connected to one corporate CS at a higher level. The corporate server CS manages budgetary information for each enterprise (organization) or for a group of related enterprises, as well as licenses. Further, the corporate server CS distributes software contents. The domain server DS can store software contents therein.

Figure 3:
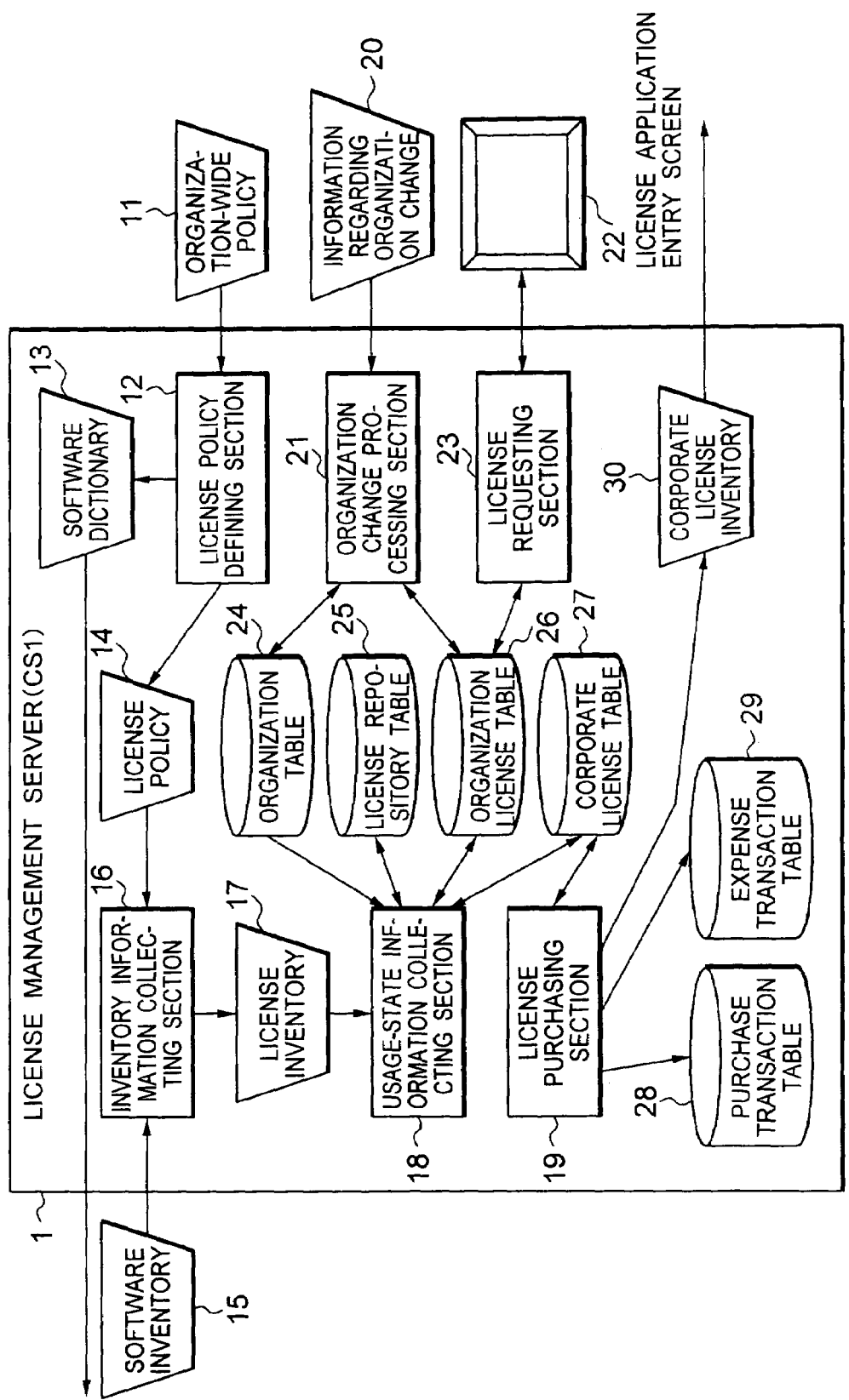
FIG. 3 is a block diagram showing an exemplary configuration of a license management server.

FIG. 3 shows an exemplary configuration of the license management server 1. A license policy defining unit 12 receives an organization-wide policy (enterprise policy) 11 from a higher-level server, creates a software dictionary 13 on the basis of the organization-wide policy 11, and sends the software dictionary 13 to a lower-level relay server or client terminal. Furthermore, the license policy defining unit 12 creates a license policy 14 on the basis of the organization-wide policy 11.

An inventory information collecting unit 16 receives software inventories 15—which are collected on the basis of the distributed software dictionary 13—and creates a license inventory 17 through comparison between the software inventories 15 and the license policy 14. While referring to data bases for management of software licenses, such as an organization table 24, a license repository table 25, an organization license table 26, and a corporate license table 27, a usage-state information collecting unit 18 accumulates information regarding the state of use of software licenses within each section of the organization, as well as information regarding the state of use of software licenses within the organization.

On the basis of the result of processing by the usage-state information collecting unit 18, a license purchasing unit 19 judges whether the number of software licenses currently used is proper, while referring to the organization license table 26 and the corporate license table 27. When it is determined that software licenses must be newly purchased, the license purchasing unit 19 generates a purchase transaction and sets it in a purchase transaction table 28. At the same time, an expense transaction to be distributed to a section of the organization which requires purchase of licenses is generated and is set in an expense transaction table 29. Further, the license purchasing unit 19 generates a corporate license inventory 30 and transmits it to a higher-level server.

When organizational-change information 20 such as personnel changes are input to an organizational-change processing unit 21, the organizational-change processing unit 21 updates the organization table 24 on the basis of the organizational-change information 20. Further, in accordance with the organizational change, the organizational-change processing unit 21 updates the contents of the organization license table 26. Specifically, the organizational-change processing unit 21 re-writes the number of software licenses allotted to each section of the organization and contained in the organization license table 26 in order to cope with personnel changes or the like.

A license requesting unit 23 updates the organization license table 26 and the corporate license table 27 on the basis of information regarding applications for software licenses used within each section, which applications are entered from a license application entry screen 22 formed of, for example, a browsing (or WEB) screen.

In the software license management performed by the usage-state information collecting unit 18, the license purchasing unit 19, the organizational-change processing unit 21, and the license requesting unit 23 of the license management server 1, there is introduced a concept of "right number" which can be increased and decreased among the number of software licenses owned by an organization, regardless of the contents of a corresponding license certificate.

The following terms are used in the following description.

"Holding number": the total number of software licenses which the organization has purchased legally from an outside source.

"Right number": the number of software licenses which each section of the organization is permitted to use and which is determined within the organization.

"Usage number": the number of software programs actually installed in client terminals such as personal computers.

The usage number includes the number of software programs pre-installed, the number of software programs which are managed independently by a section or an individual, and other software programs (free software), which have different histories (purchase classifications). However, the system according to the present embodiment manages the usage number of software licenses other than software licenses which are excluded from management.

When software licenses are purchased in accordance with the number of licenses in applications from different sections of the organization, the right number is incremented by the requested number of licenses. The number actually added is a number obtained through correction of the requested number. The corrected request number is determined as follows, regardless of the requested number of each section.

1) If the usage number−right number>0, then (the usage number−the right number) is regarded as the corrected request number.

2) If the usage number−right number≦0, then the corrected request number is set to zero, and the usage number is substituted for the right number.

When the actual usage number within a section of the organization is less than the right number of the section, the right number is decreased. Thus, unused licenses are automatically discovered, so that the organization as a whole can use software licenses effectively.

Software licenses are purchased in a number equal to a number obtained by subtraction of the present holding number of software licenses from the usage number of the entire organization. At this time, an expense to be borne by each section of the organization is calculated on the basis of the unit price obtained through division of a purchase price by the corrected request number. The thus-obtained expense is distributed to the corresponding sections.

When the holding numbers of software licenses of grouped enterprises are managed collectively, a total holding number, a total usage number, and a total necessary number of software licenses within each enterprise are reported in the form of a corporate license inventory to a corporate server (CS) located at a higher level relative to the corporate server (CS) of the enterprise. A managing section can graph the state of usage of software licenses within the entire group of enterprises.

Figures 4F, 4G, 5A, 5B:
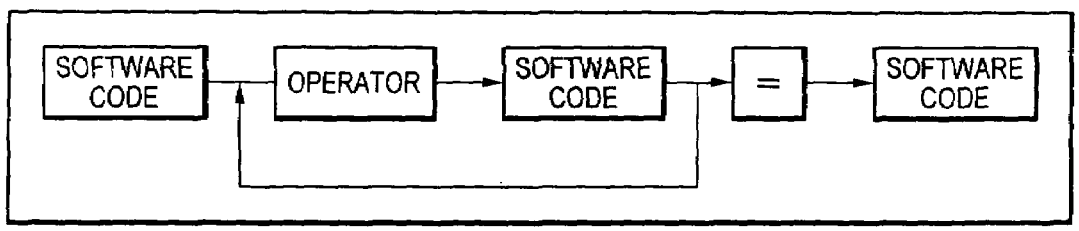

FIGS. 4A to 4G show examples of tables used in the license management server 1. The corporate license table 27 holds information regarding software licenses which are owned by the entire organization (enterprise). As shown in FIG. 4A, for each software program, the corporate license table 27 contains a license code which identifies a corresponding software license, a necessary number which indicates the number of necessary software licenses, a holding number of software licenses, a right number which is the sum of the right numbers of different sections, a request number which is the sum of the request numbers of different sections, a corrected request number which is the sum of the corrected request numbers of different sections, a total usage number which is the sum of the usage numbers of different sections, and a negotiated unit price of a software license.

The organization table 26 is used for managing information in relation to software licenses for each section of the organization. As shown in FIG. 4B, for each combination of sections and licenses, the corporate license table 27 contains an organization code which identifies a section, a license code which identifies a corresponding software license, a necessary number which indicates the number of necessary software licenses, a right number which represents the number of software licenses permitted to be used within the section, a request number which is requested in order to increase the right number, a corrected request number which is determined in accordance with the actual state of usage, and a usage number of software licenses within the section.

The organization table 24 is a table for holding information representing assignment of employees to respective sections. As shown in FIG. 4C, for each employee, the organization table 24 includes an organization code which identifies a corresponding section and an employee ID which identifies the employee. If necessary, the organization table 24 may include information regarding responsibilities and information for contact.

The license repository table 25 is used to manage information regarding software programs used by the employees. As shown in FIG. 4D, for each combination of employees and licenses, the license repository table 25 holds an employee ID which identifies the employee, an equipment ID of a personal computer or the like which the employee uses, a license code which identifies a software license used, and a usage number thereof.

The purchase transaction table 28 is generated when purchase of software licenses becomes necessary and is used to manage a purchase transaction. As shown in FIG. 4E, for each combination of orders and licenses, the purchase transaction table 28 holds an order number which identifies an order, a license code which identifies a software license to be purchased, a purchase number which indicates the number of purchased software licenses, the purchase price, and the purchase date.

The expense transaction table 29 is used to manage an expense transaction which, upon purchase of software licenses, is performed in order to distribute the expense to sections which necessitate the purchase of software licenses. As shown in FIG. 4F, for each combination of sections and licenses, the expense transaction table 29 holds an organization code which identifies each section of the organization, a license code which identifies a purchased software license, an order number which identifies an order, an expense which is a portion of the purchase price to be borne by the section, and a purchase date.

The license inventory 17 shows the status of software licenses which are actually used in client terminals at the present time. The license inventory 17 is generated on the basis of the software inventory 15 collected by the inventory information collecting unit 16. As shown in FIG. 4G, for each combination of employees and licenses, the license inventory 17 holds an employee ID which identifies the employee, an equipment ID of a personal computer or the like which the employee uses, a license code which identifies a software license, and a usage number thereof. The license repository table 25 is updated in accordance with the license inventory 17.

The organization-wide policy 11 is a script which contains information regarding the license policy 14 and the software dictionary 13. The license policy 14 includes conditions used for judging software licenses and is described in a form as shown in FIG. 5A. Software codes are codes which are assigned to different software programs in order to uniquely identify each software program in the entire system and correspond to the above-described license codes. Each software code may be defined by use of a plurality of software codes connected by use of one or more operators. As shown in FIG. 5B, AND and OR operators may be used as operators to describe a software code.

The software dictionary 13 contains the following data (a) to (c).

(a) Conditions for searching a file resident on a computer.

(b) Conditions for detecting a character string described in the registry of the computer.

(c) Software code which is reported as inventory information when conditions are met and which is uniquely determined within the entire system.

In the client terminal, which is a computer subjected to inventory-collecting operation, a file and a character string described in the registry are searched on the basis of the software dictionary 13, and when the conditions are met, the software inventory 15 information including a software code is reported to the license management server 1 as the software inventory 15. The technique for inventory collection is a well-known technique.

The inventory information collecting unit 16 of the license management server 1 reads the software inventory 15, determines, according to the route of the license policy 14, a software code of a software program for which a license has actually been obtained, and passes the software code to the usage-state collecting unit 18 as the license inventory 17.

Figure 6:
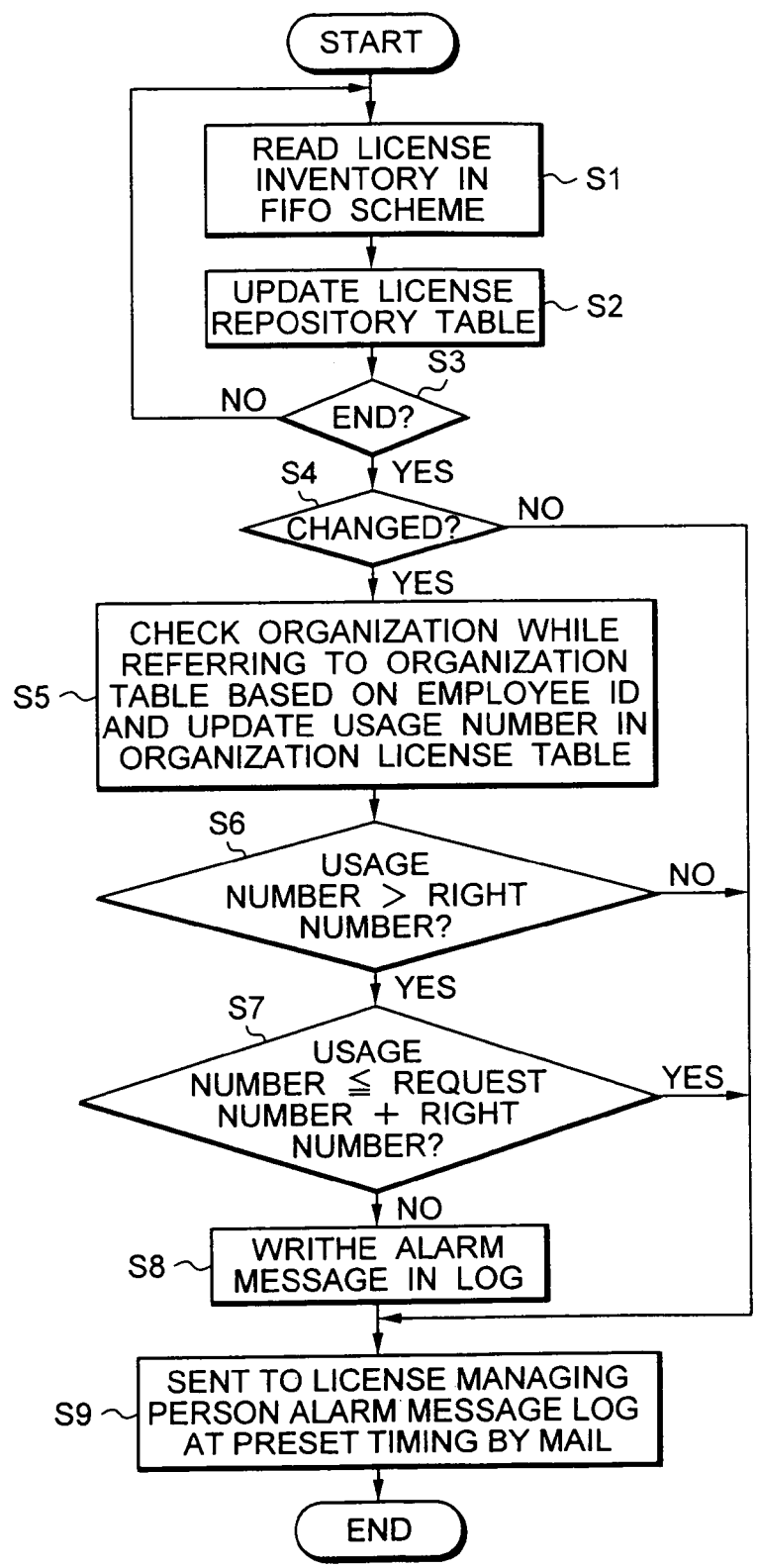
FIG. 6 is a flowchart showing processing carried out in a usage-state information collecting unit.

FIG. 6 is a flowchart showing processing in the usage-state information collecting unit 18. In step S1, the usage-state information collecting unit 18 reads a license inventory 17 collected by the inventory information collecting unit 16, according to a FIFO (First-In First-Out) scheme. In step S2, the usage-state information collecting unit 18 updates the license repository table 25 on the basis of each license inventory 17. This processing is repeated for all license inventories 17 (step S3).

Subsequently, in response to a modification of the license repository table 25, which serves as a trigger (step S4), the usage-state information collecting unit 18 proceeds to step S5 in order to identify the section to which the employee is assigned and to update the usage number of software licenses contained in the organization license table 26.

Subsequently, the following processing is performed for each license code stored in the organization license table 26. Then, it is judged whether the usage number is greater than the right number (step S6). When the usage number is greater than the right number, a judgment is made as to whether the difference therebetween is within a range corresponding to the request number. That is, it is judged whether the usage number is not greater than (request number+right number) (step S7). When the difference falls within the range corresponding to the request number, usage of the corresponding software program is judged to be proper. When the difference falls outside the range corresponding to the request number, or when the usage number is in excess of (request number+right number), usage of the corresponding software program is judged to be improper. In this case, an alarm message to that effect is written in a log (step S8).

The log of alarm messages is reported to a person who is in charge of license management, at a preset proper timing by means of an electronic mail message or the like (step S9).

Figure 7:
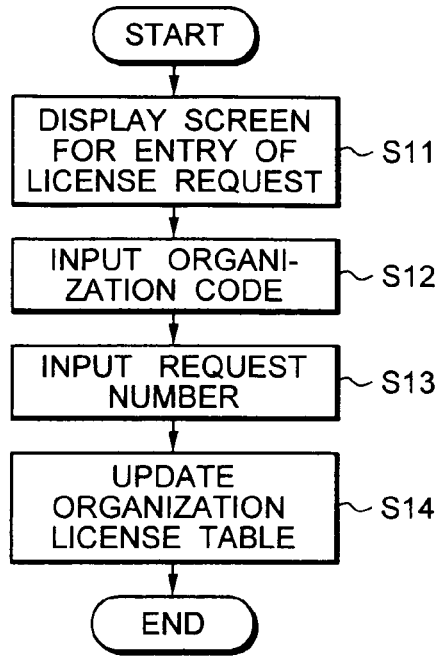
FIG. 7 is a flowchart showing processing carried out in a license requesting unit.

FIG. 7 is a flowchart showing processing carried out in the license requesting unit 23. In response to a request from a section of the organization, the license requesting unit 23 displays a license application entry screen 22 which is formed of, for example, a browsing (or WEB) screen and which is used for requesting a software license (step S11). By use of the license application entry screen 22, an organization code and a request number of each software license needed are input (steps S12 and S13). After confirming that the input information is proper, the license requesting unit 23 updates the request-number column of the organization license table 26 on the basis of the input information (step S14).

Figure 8:
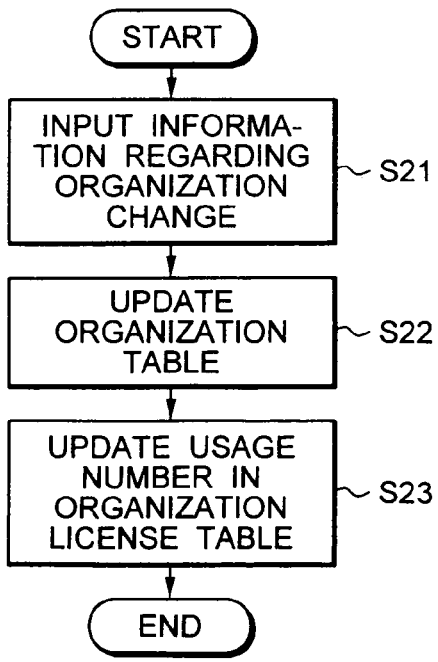
FIG. 8 is a flowchart showing processing carried out in an organizational-change processing unit.

FIG. 8 is a flowchart showing processing carried out in the organizational-change processing unit 21. The organizational-change processing unit 21 accepts organizational-change information 20, such as information regarding personnel changes (step S21). On the basis of the input information, the correspondence between the organization codes and the employee ID's in the organization table 24 is updated. Subsequently, the license codes of software licenses which had been used by an employee who has moved are searched for in the license repository table 25, and the usage number of the section from which the employee has moved and the usage number of the section to which the employee has moved, stored in the organization table 26, are updated (step S23). Thus, proper management of software licenses can be maintained even when the organization is changed.

Figure 9:
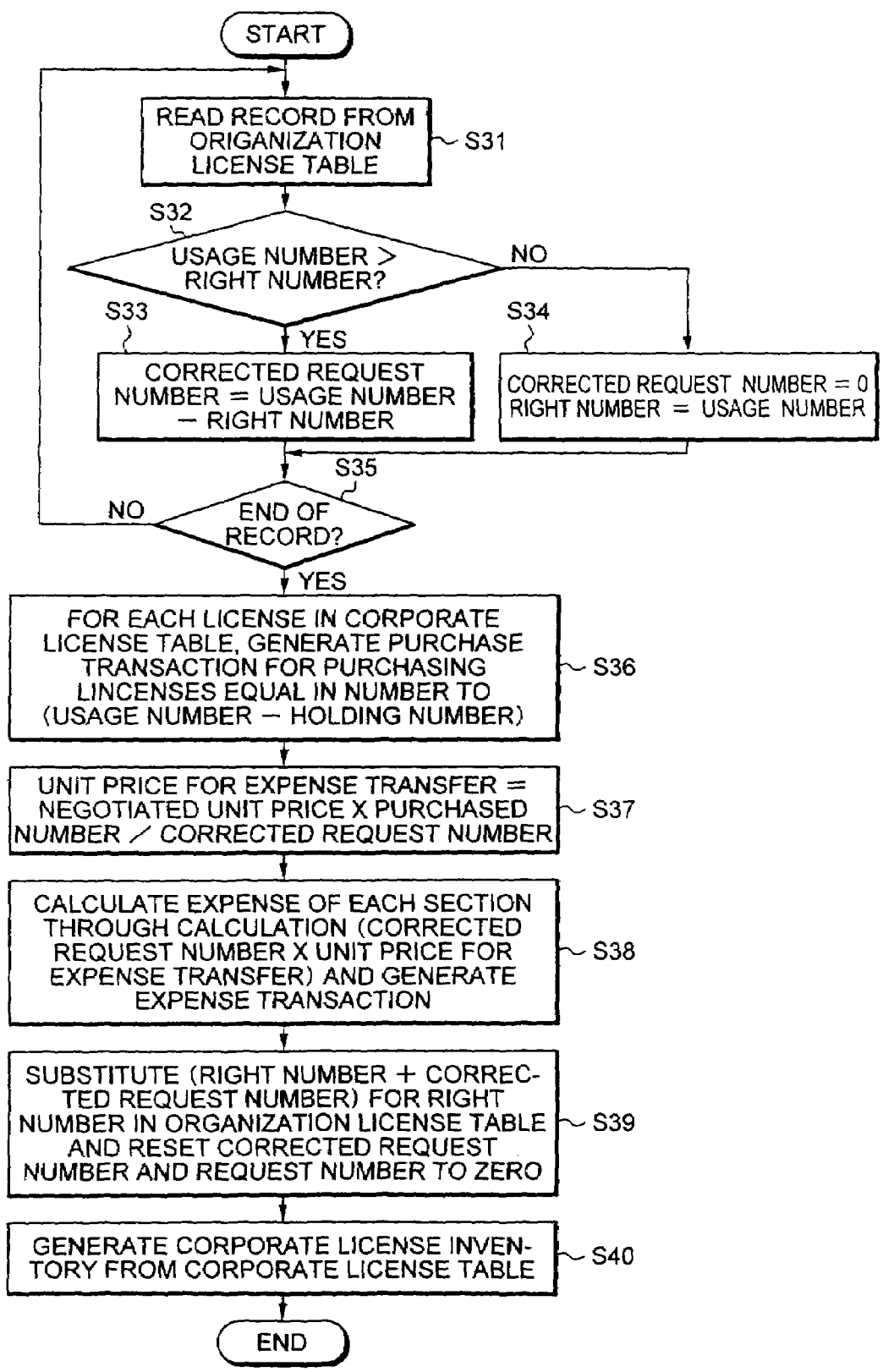
FIG. 9 is a flowchart showing processing carried out in a license purchasing unit.

FIG. 9 is a flowchart showing processing carried out in the license purchasing unit 19. The license purchasing unit 19 is activated periodically, such as once a month, in order to perform the following processing. The functions of the license purchasing unit 19 are correction of license request number, discovery of unused licenses, generation of a transaction for purchase of software licenses, and transfer of expenses to respective sections of the organization.

The license purchasing unit 19 first stops updating of the usage number of software licenses and license request processing for each section. Subsequently, the license purchasing unit 19 reads records (each including an organization code, a license code, a necessary number, a right number, a request number, a corrected request number, and a usage number) (step S31). For each of the records, the license purchasing unit 19 compares the usage number and the right number (step S32). When the usage number is greater than the right number, the license purchasing unit 19 proceeds to step S33, and when the usage number is not greater than the right number, the license purchasing unit 19 proceeds to step S34.

In step S33, (the usage number−the right number) is calculated in order to obtain the corrected request number. In step S34, the corrected request number is set to zero, and the usage number is substituted for the right number.

Subsequently, for each of the licenses contained in the corporate license table 27, the license purchasing unit 19 calculates (the usage number−the holding number) in order to obtain a purchase number, generates a purchase transaction, and sets it in the purchase transaction table 28. Further, the license purchasing unit 19 adds the thus-calculated purchase number to the holding number in the corporate license table 27 (step S36).

Subsequently, in order to transfer expenses to the respective sections of the organization, the license purchasing unit 19 multiplies the negotiated unit price by the purchase number and then divides the result by the corrected request number in order to obtain a unit price for expense transfer (step S37). On the basis of the thus-obtained unit price, the license purchasing unit 19 calculates the expense to be transferred to each relevant section in accordance with the formula "the corrected request number×the unit price for expense transfer," generates an expense transaction, and writes it into the expense transaction table 29 (step S39). Subsequently, the license purchasing unit 19 extracts a license code, a necessary number, a holding number, and a usage number from the corporate license table 27, generates a corporate license inventory 30 containing these data, and transmits it to the operation managing server 3 on the higher level (step S40).

FIGS. 10A to 10D show examples of screens displayed at the license management server 1 and the operation managing server 3 and used for referring to the state of usage of software licenses.

On the left side of the display screen, a hierarchy of the organization is displayed in the form of a tree. The state of usage of software licenses within each selected section within the hierarchy is disposed in respective columns at the right side of the display screen. FIG. 10A depicts a screen which shows the state of usage of software licenses within the entire enterprise (organization). FIG. 10B depicts a screen which shows the state of usage of software licenses within a section, such as the marketing department. FIG. 10C depicts a screen which shows the state of usage of software licenses within the personnel department. Further, through reference to the screen of FIG. 10D showing the state of usage of software licenses within a group of related enterprises, there can be obtained the state of usage of software licenses within the related enterprise, which belongs to the same group.

In the examples shown in FIGS. 10A to 10D, not only the number of software licenses subjected to license management but also the number of software licenses not subjected to license management are displayed. However, since the number of software licenses not subjected to license management does not relate directly to the present invention, its description will be omitted. Through reference to FIG. 10A—which shows the state of usage of software licenses within the entire enterprise—it is found that the holding number of software licenses for "PROG-2000" is 1000, the usage number thereof is 990, and the number of unused software licenses is 10. The ten unused software licenses can be used when a certain section requests software licenses, whereby purchase of additional software licenses is avoided. Further, whereas the holding number of software licenses for "AB-OFFICE 99" is 500, the usage number thereof is 510, so that software licenses are short by 10. In this case, 10 software licenses must be purchased.

Figure 11:
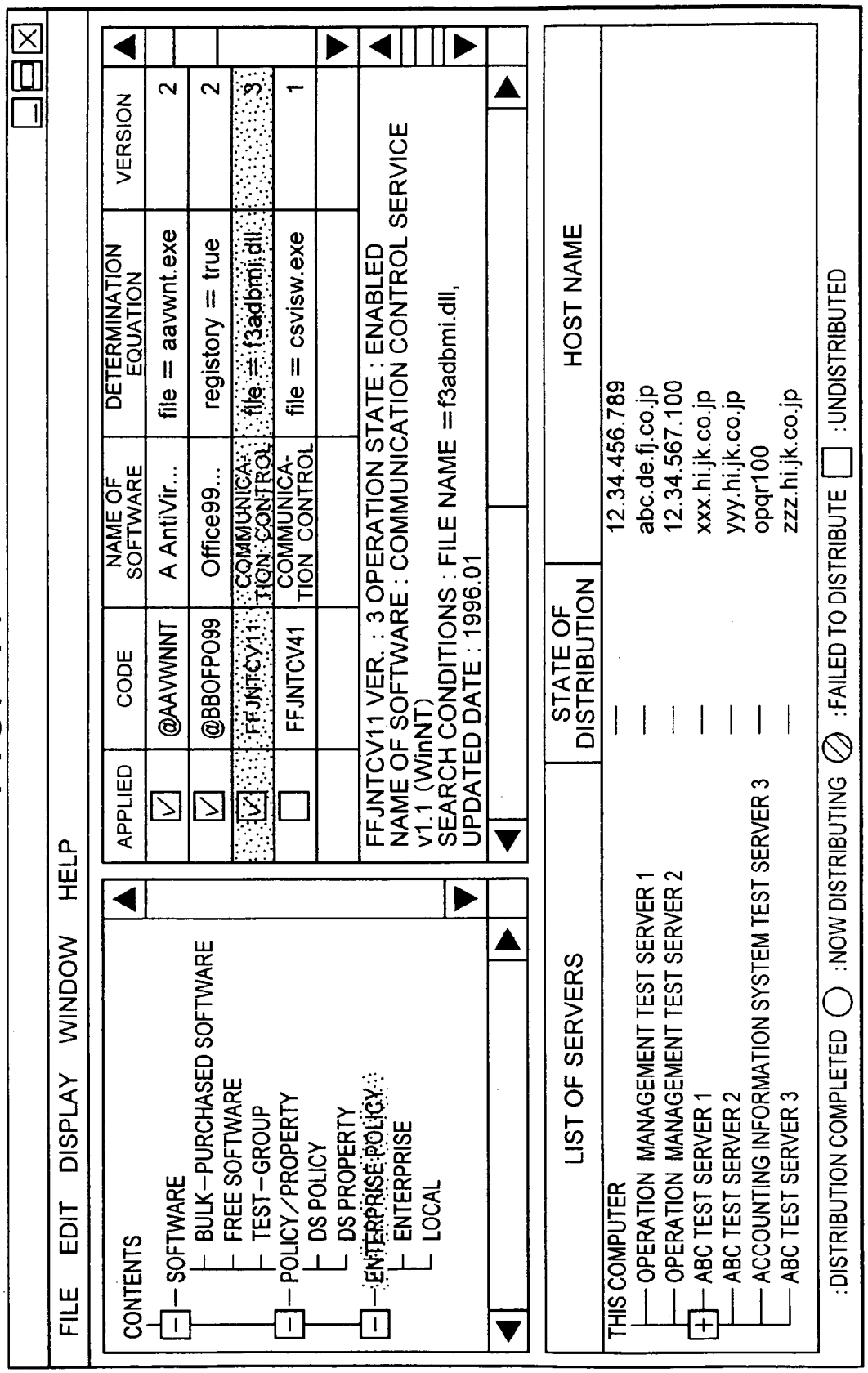
FIG. 11 is a diagram showing an example of a screen used for inputting and editing an organization-wide policy.

FIG. 11 shows an example of a screen used for inputting and editing the organization-wide policy 11. The organization-wide policy 11 is a definition statement which defines a logic for collecting the usage numbers of software licenses and may be of an organization version which is commonly used among all the corporate servers (CS) or a local version which is effective in a specific corporate server (CS). A display area at the upper right of the input/edit screen shown in FIG. 11 displays a software code, a name, a determination equation representing search conditions, a version number, etc. for each software program for which inventory collection is performed. Furthermore, a lower display area enables input, editing, and display of a list of servers to which the organization-wide policy 11 is distributed. Also, the state of distribution can be grasped by use of the lower display area. Collection of inventory information is performed for client terminals (CT) which are connected to a server to which the software content is distributed. Meanwhile, on the basis of the collected inventory information, the organization-wide policy 11 may be automatically updated for maintenance.

As described above, the present invention employs a mechanism for collecting software inventories 15 from client terminals (CT), such as personal computers, present in the network and transmitting the thus-collected software inventories 15 to the higher-level server (DS, CS). Further, a definition statement called an organization-wide policy 11 which defines a logic for enabling judgment of software licenses from the software inventories 15 is distributed from the highest-level operation managing server 3, and upon receipt of the organization-wide policy, the license policy defining unit 12 of the license management server 1 selects software licenses which are required within the organization.

The license policy defining unit 12 generates the license policy 14 and the software dictionary 13 from the organization-wide policy 11, and, if necessary, the software dictionary 13 is distributed to all the client terminals (CT) connected to the license management server 1 via the relay server (DS).

Once the organization-wide policy 11 is designated, it is updated automatically without intervention of a person which manages the corporate server (CS). Since the software inventories 15 which are collected on the client terminal (CT) by use of the software dictionary 13 are collected to the license management server 1, software licenses within the organization can be managed in a unified manner.

Furthermore, when the above-described software license management function is combined with the function of distributing software contents over the network, licensed software contents can be distributed properly and efficiently.

As described above, the present invention can realize software license management which can be take advantage of expense sharing by different sections of an organization without a huge amount of human labor. Thus, through automation of management work, labor costs for software license management can be reduced. Further, the mechanism for properly purchasing software licenses prevents illegal copying and avoids purchase of an excess number of software licenses. Moreover, when software license management is performed throughout an entire enterprise or an entire group of enterprises, a discount is obtained due to purchase of a large number of software licenses, so that the negotiated unit price can be reduced greatly.

The many features and advantages of the invention are apparent from the detailed specification and, thus, the appended claims are intended to cover all such features and advantages of the invention which fall within the true sprit and scope of the invention. Further, since numerous modifications and changes will readily occur to those skilled in the art, it is not intended that the invention be limited to the exact construction and operation illustrated and described, and accordingly all suitable modifications and equivalents may be resorted to, so long as they fall within the scope of the invention.

What is claimed is:

1. An apparatus for managing software licenses of different software products, the apparatus comprising:
    a managing unit managing a number of software licenses, for the different software products, owned by an organization;
    a collecting unit collecting inventory information from each of a plurality of computers within the organization, inventory information of a computer comprising an inventory regarding software actually installed nonvolatiley in the corresponding computer, where the inventory information of each computer is generated by scanning the computer to search for predefined indicia of nonvolatile installation of respective of the different software products without regard for whether or not the installed software is currently executing on the computer;
    a calculating unit calculating a difference between the number of software licenses owned by the organization and a number of software licenses actually installed, which is calculated on the basis of the collected inventory information, and outputting information representing an excess or insufficiency in the number of software licenses or information regarding purchase of additional software licenses; and
    a generating unit generating a software dictionary which includes the predefined indicia of nonvolatile installation of respective of the different software products, and which identifies software products;
    wherein the inventory information is generated by using the generated software dictionary which is distributed to each of the plurality of computers in the organization from which the inventory information is collected;
    in a case that the sum of the software-license usage numbers of all sections of the organization exceeds the software-license holding number, in response to such a determination automatically generating a purchase transaction for purchasing software licenses based on a difference between the sum and the software-license holding number;
    adding a number of purchased software licenses to the software-license holding number; and
    distributing a purchase expense to a section whose software-license usage number is greater than the corresponding software-license right number, and updating the software-license right number of the section.

2. An apparatus for managing software licenses of different software products, the apparatus comprising:
    a storage storing a number of software licenses for the different software products, owned by an entire organization and storing a number of software licenses allotted to sections of the organization;
    a collecting unit collecting inventory information from each of a plurality of computers within the organization, inventory information of a computer comprising an inventory regarding software actually installed nonvolatiley in the computer, where the inventory information of each computer is generated by scanning the computer to search for predefined indicia of nonvolatile installation of respective of the different software products without regard for whether or not the installed software is currently executing on the computer;
    a calculating unit calculating a difference between the number of software licenses allotted to each of the sections of the organization and a number of corresponding software licenses actually installed on the computers of the section which is calculated on the basis of the collected inventory information and for outputting warning information in a case that the number of software licenses in actual use is greater than the number of allotted software licenses; and
    a generating unit generating a software dictionary which includes the predefined indicia of nonvolatile installation of respective of the different software products, and which identifies software products;

wherein the inventory information is generated by using the generated software dictionary which is distributed to each of the plurality of computers in the organization from which the inventory information is collected;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number; and distributing a purchase expense to a section whose software-license usage number is greater than the corresponding software-license right number, and updating the software-license right number of the section.

3. An apparatus for managing software licenses of different software products, the apparatus comprising:

a managing unit managing a number of software licenses, for the different software products, owned by an entire organization and managing a number of software licenses allotted to sections of the organization;

a collecting unit collecting inventory information from each of a plurality of computers within the organization, inventory information a computer comprising an inventory regarding software actually installed nonvolatiley in the computer, where the inventory information of each computer is generated by scanning the computer to search for predefined indicia of nonvolatile installation of respective of the different software products without regard for whether or not the installed software is currently executing on the computer;

a calculating unit calculating a difference between the number of software licenses allotted to each of the sections of the organization and a number of corresponding software licenses actually installed on the computers of the section which is calculated on the basis of the collected inventory information and for outputting warning information which indicates that the section is allotted an excess number of software licenses compared with the number of software licenses in actual use; and a generating unit generating a software dictionary which includes the predefined indicia of nonvolatile installation of respective of the different software products, and which identifies software products;

wherein the inventory information is generated by using the generated software dictionary which is distributed to each of the plurality of computers in the organization from which the inventory information is collected;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number; and distributing a purchase expense to a section whose software-license usage number is greater than the corresponding software-license right number, and updating the software-license right number of the section.

4. An apparatus for managing software licenses of different software products, the apparatus comprising:

a managing unit managing a number of software licenses, for the different software products, owned by an organization;

a receiving unit receiving, from a higher-level server, an organization-wide policy which is information regarding a logic for collection of a usage number of software licenses;

a generating unit generating, on the basis of the organization-wide policy, a software dictionary for identification of software and a license policy used for determination of presence of a license;

a distributing unit distributing the software dictionary, over a network, to each of a plurality of computers within the organization in order to collect inventory information from each of the computers, the inventory information of a computer comprising an inventory regarding software actually installed nonvolatiley in the computer, where the inventory information of each computer is generated by scanning the computer to search for predefined indicia of nonvolatile installation of respective of the different software products without regard for whether or not the installed software is currently executing;

a reporting unit reporting to the higher-level server a usage number of software licenses calculated on the basis of the collected inventory information and the license policy; and a generating unit generating a software dictionary which includes the predefined indicia of nonvolatile installation of respective of the different software products, and which identifies software products;

wherein the inventory information is generated by using the generated software dictionary which is distributed to each of the plurality of computers in the organization from which the inventory information is collected;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number; and distributing a purchase expense to a section whose software-license usage number is greater than the corresponding software-license right number, and updating the software-license right number of the section.

5. A method for managing software licenses of different software products, the apparatus comprising:

managing a software-license holding number which represents a number of software licenses, for the different software products, owned by an organization, and managing, for sections of the organization, a software-license right number which represents a number of software licenses permitted to be used and a software-license usage number which represents a number of software licenses in actual use;

collecting, over a network, inventory information of a plurality of computers within the organization, the inventory information of a computer comprising an inventory regarding software actually installed nonvolatiley in the computers, where the inventory information is generated by scanning the computer to search for predefined indicia of nonvolatile installation of respective of the different software products without regard for whether or not the installed software is currently executing on the computer, and updating the software-license usage number of each of the sections of the organization;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number;

distributing a purchase expense to a section whose software-license usage number is greater than the corresponding software-license right number, and updating the software-license right number of the section; and generating a software dictionary which includes the predefined indicia of nonvolatile installation of respective of the different software products, and which identifies software products; and wherein the inventory information is generated by using the generated software dictionary which is distributed to each of the plurality of computers in the organization from which the inventory information is collected.

6. A method for managing software licenses of different software products, the apparatus comprising:

managing a software-license holding number which represents a number of software licenses, for the different software products, owned by an organization, and managing, for sections of the organization, a software-license right number which represents a number of software licenses permitted to be used and a software-license usage number which represents a number of software licenses in actual use;

collecting, over a network, inventory information of a plurality of computers within the organization, the inventory information of a computer comprising an inventory regarding software actually installed nonvolatiley in the computers, where the inventory information of each computer is generated by scanning the computer to search for predefined indicia of nonvolatile installation of respective of the different software products without regard for whether or not the installed software is currently executing on the computer, and updating the software-license usage number of each of the sections of the organization;

in a case that the software-license holding number is greater than the sum of the software-license usage numbers of all sections of the organization, managing, as a software-license nonuse number, a difference between the software-license holding number and the sum;

in a case that a necessity of purchasing software licenses arises and that a number of software licenses to be purchased in response to purchase requests from at least one section of the organization is grater than the software-license nonuse number, obtaining an actual number of software licenses to be purchased as the deference between them;

generating a software dictionary which includes the predefined indicia of nonvolatile installation of respective of the different software products, and which identifies software products;

wherein the inventory information is generated by using the generated software dictionary which is distributed to each of the plurality of computers in the organization from which the inventory information is collected;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number; and distributing a purchase expense to a section whose software-license usage number is greater than the corresponding software-license right number, and updating the software-license right number of the section.

7. A storage medium storing a program for managing software licenses by use of a computer, the program causing the computer to perform processing comprising:

a managing unit managing a number of software licenses, for the different software products, owned by an organization;

a collecting unit collecting inventory information from each of a plurality of computers within the organization, inventory information of a computer comprising an inventory regarding software actually installed nonvolatiley in the corresponding computer, where the inventory information of each computer is generated by scanning the computer to search for predefined indicia of nonvolatile installation of respective of the different software products without regard for whether or not the installed software is currently executing; and a calculating unit calculating a difference between the number of software licenses owned by the organization and a number of software licenses actually installed, which is calculated on the basis of the collected inventory information and outputting information representing an excess or insufficiency in the number of software licenses or information regarding purchase of additional software licenses, wherein:

the program causing the computer to perform processing further comprising generating a software dictionary which includes the predefined indicia of nonvolatile installation of respective of the different software products, and which identifies software products;

the generated software dictionary is distributed to the plurality of computers in the organization from which the inventory information is collected;

the inventory information is collected by the collecting of the inventory information;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number; and distributing a purchase expense to a section whose software-license usage number is greater than the corresponding software-license right number, and updating the software-license right number of the section.

8. A storage medium storing a program for managing software licenses by use of a computer, the program causing the computer to perform processing comprising:

managing a number of software licenses owned by an organization and a number of software licenses allotted to sections of the organization;

collecting inventory information from each of a plurality of computers within the organization, the inventory information including information regarding software actually installed nonvolatiley in the computers, where the inventory information is collected by scanning the computer to search for predefined indicia of nonvolatile installation of respective of the different software products without regard for whether or not the installed software is currently executing; and calculating a difference between the number of software licenses allotted to each of the sections of the organization and a number of software licenses actually used in the section which is calculated on the basis of the collected inventory information and for outputting warning information in a case that the number of allotted software licenses is greater than the number of software licenses in actual use or in a case that the section is allotted an excess number of software licenses compared with the number of software licenses in actual use, wherein:

the program causing the computer to perform processing further comprising generating a software dictionary which identifies software during collection of the inventory information;

the generated software dictionary is distributed to the plurality of computers in the organization from which the inventory information is collected; and the inventory information is collected by the means for collecting the inventory information;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number; and distributing a purchase expense to a section whose software-license usage number is greater than the corresponding software-license right number, and updating the software-license right number of the section.

9. A storage medium storing a program for managing software licenses by use of a computer, the program causing the computer to perform processing comprising:

managing a number of software licenses owned by an organization;

receiving from a higher-level server an organization-wide policy which is information regarding a logic for collection of a usage number of software licenses;

generating, on the basis of the organization-wide policy, a software dictionary for identification of software and a license policy used for determination of presence of a license;

distributing the software dictionary to each of a plurality of computers within the organization in order to collect inventory information from each of the computers, the inventory information including information regarding software actually installed nonvolatiley in the computers, where the inventory information is collected by scanning the computer to search for predefined indicia of nonvolatile installation of respective of different software products without regard for whether or not the installed software is currently executing;

reporting to the higher-level server a usage number of software licenses calculated on the basis of the collected inventory information and the license policy; and generating a software dictionary which includes the predefined indicia of nonvolatile installation of respective of the different software products, and which identifies software products;

wherein the inventory information is generated by using the generated software dictionary which is distributed to each of the plurality of computers in the organization from which the inventory information is collected;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number; and distributing a purchase expense to a section whose software-license usage number is greater than the corresponding software-license right number, and updating the software-license right number of the section.

10. A storage medium storing a program for managing software licenses by use of a computer, the program causing the computer to perform processing comprising:

managing a software-license holding number which represents a number of software licenses owned by an organization, and managing, for sections of the organization, a software-license right number which represents a number of software licenses permitted to be used and a software-license usage number which represents a number of software licenses in actual use;

collecting inventory information from each of a plurality of computers within the organization, the inventory information including information regarding software actually installed nonvolatiley in the computers, where the inventory information is collected by scanning the computer to search for predefined indicia of nonvolatile installation of respective of different software products without regard for whether or not the installed software is currently executing, and updating the software-license usage number of each of the sections of the organization;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number;

distributing a purchase expense to a section whose software-license usage number is greater than the corresponding software-license purchase number, and updating the software-license right number of the section;

a generating unit generating a software dictionary which includes the predefined indicia of nonvolatile installation of respective of the different software products, and which identifies software products;

wherein the inventory information is generated by using the generated software dictionary which is distributed to each of the plurality of computers in the organization from which the inventory information is collected;

in a case that the sum of the software-license usage numbers of all sections of the organization exceeds the software-license holding number, in response to such a determination automatically generating a purchase transaction for purchasing software licenses based on a difference between the sum and the software-license holding number;

adding a number of purchased software licenses to the software-license holding number; and distributing a purchase expense to a section whose software-license usage number is greater than the corresponding software-license right number, and updating the software-license right number of the section.

* * * * *